Figure 1:
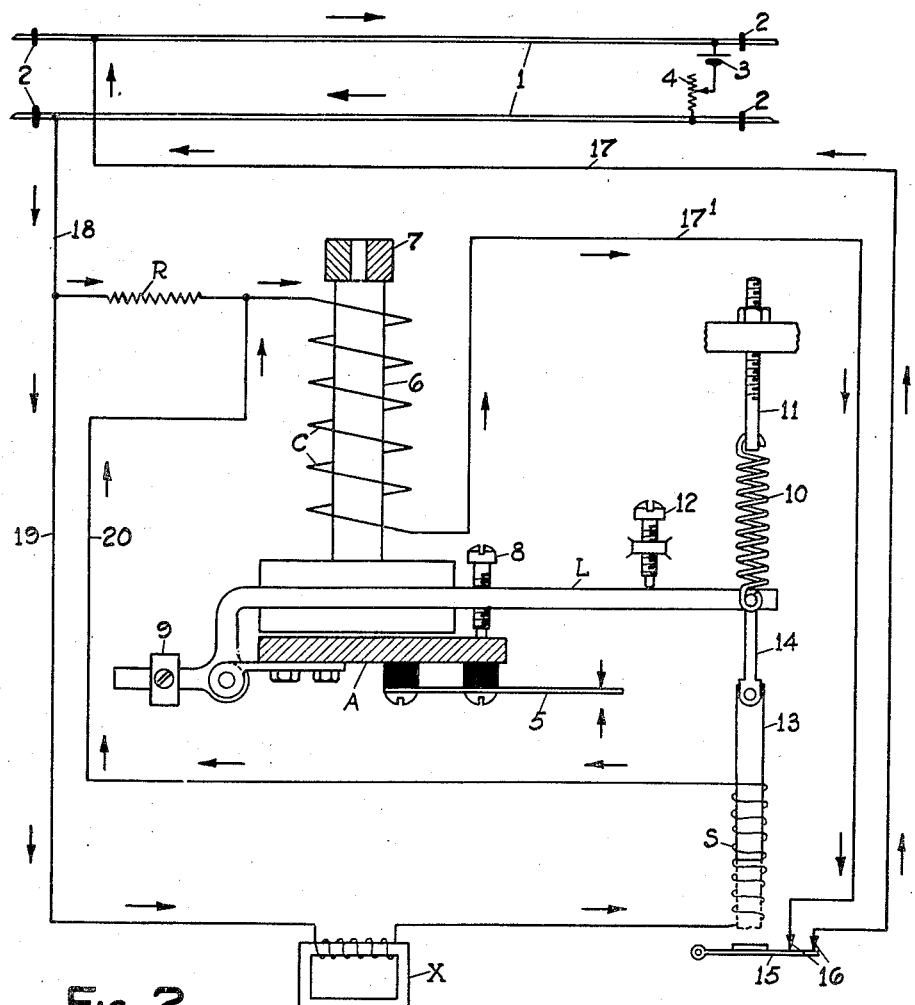

Nov. 8, 1938.   N. D. PRESTON   2,135,528
RAILWAY TRACK CIRCUIT AND RELAY THEREFOR
Filed July 11, 1935   3 Sheets-Sheet 1

INVENTOR
Neil D. Preston

Nov. 8, 1938.    N. D. PRESTON    2,135,528
RAILWAY TRACK CIRCUIT AND RELAY THEREFOR
Filed July 11, 1935    3 Sheets-Sheet 3

INVENTOR
Neil D. Preston

Patented Nov. 8, 1938

2,135,528

UNITED STATES PATENT OFFICE 2,135,528

RAILWAY TRACK CIRCUIT AND RELAY THEREFOR

Neil D. Preston, Rochester, N. Y., assignor to General Railway Signal Company, Rochester, N. Y.

Application July 11, 1935, Serial No. 30,842

21 Claims. (Cl. 246—41)

This invention relates to track circuits for railroads, and more particularly to improvements in electro-responsive means performing the function of the track relay of the track circuit.

In the usual and well-known normally energized track circuit commonly used in signalling systems on railroads, there are considerable variations in ballast resistance in wet and dry weather; and these variations in ballast leakage materially change the current normally supplied to the track relay. The leakage paths afforded by the ballast conduct current from the track battery which flows through the limiting resistance used in series with the track battery in accordance with the usual practice; and the inter-rail voltage supplying current to the track relay is varied by the greater or less voltage drop through this limiting resistance and the rail resistance as more or less current flows through the ballast.

In view of such variations in ballast resistance, the voltage of the track battery is usually selected and the limiting resistance so adjusted as to provide sufficient current through the relay to maintain its armature attracted under the most unfavorable wet ballast conditions; and it is apparent that, once such adjustment has been made, there will be excess current through the relay to interfere with its proper shunting under dry ballast conditions.

This ballast leakage under consideration is of the same nature in its effect upon the track relay as the wheel shunt of a car or train; but the changes in ballast resistance are very gradual as the ballast becomes wet or dries out, whereas the wheel shunt is suddenly applied and removed.

With these considerations in mind, it is proposed in accordance with this invention, generally speaking, to improve the operation and shunting characteristics of track circuits by providing a track relay structure with pull compensating means, such that the drop-away and pick-up characteristics of the relay are not materially changed by variations in the relay energizing current, and by providing additional means, responsive to the quick change in relay energizing current occurring when a train enters and leaves the track circuit, for rendering said pull compensating means temporarily ineffective, so that the armature of the relay will drop and pick up as the wheel shunt is applied and removed.

The principles and functions underlying the invention, its characteristic features, attributes and advantages will be in part apparent and in part more fully explained as the description progresses.

Figure 2:
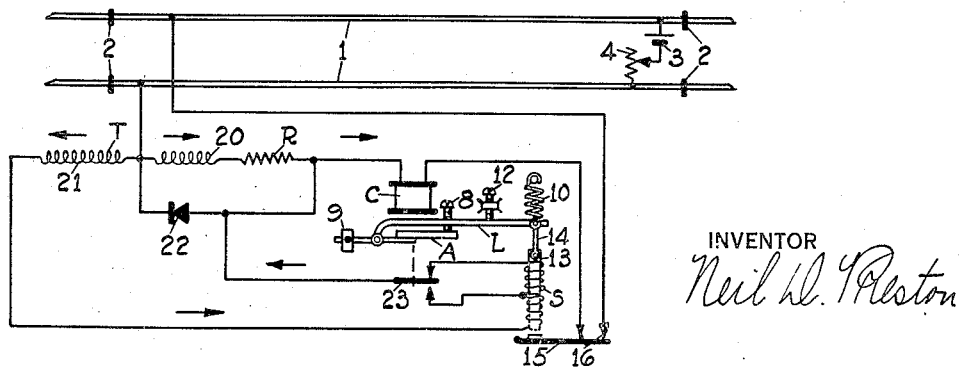
Figure 3:
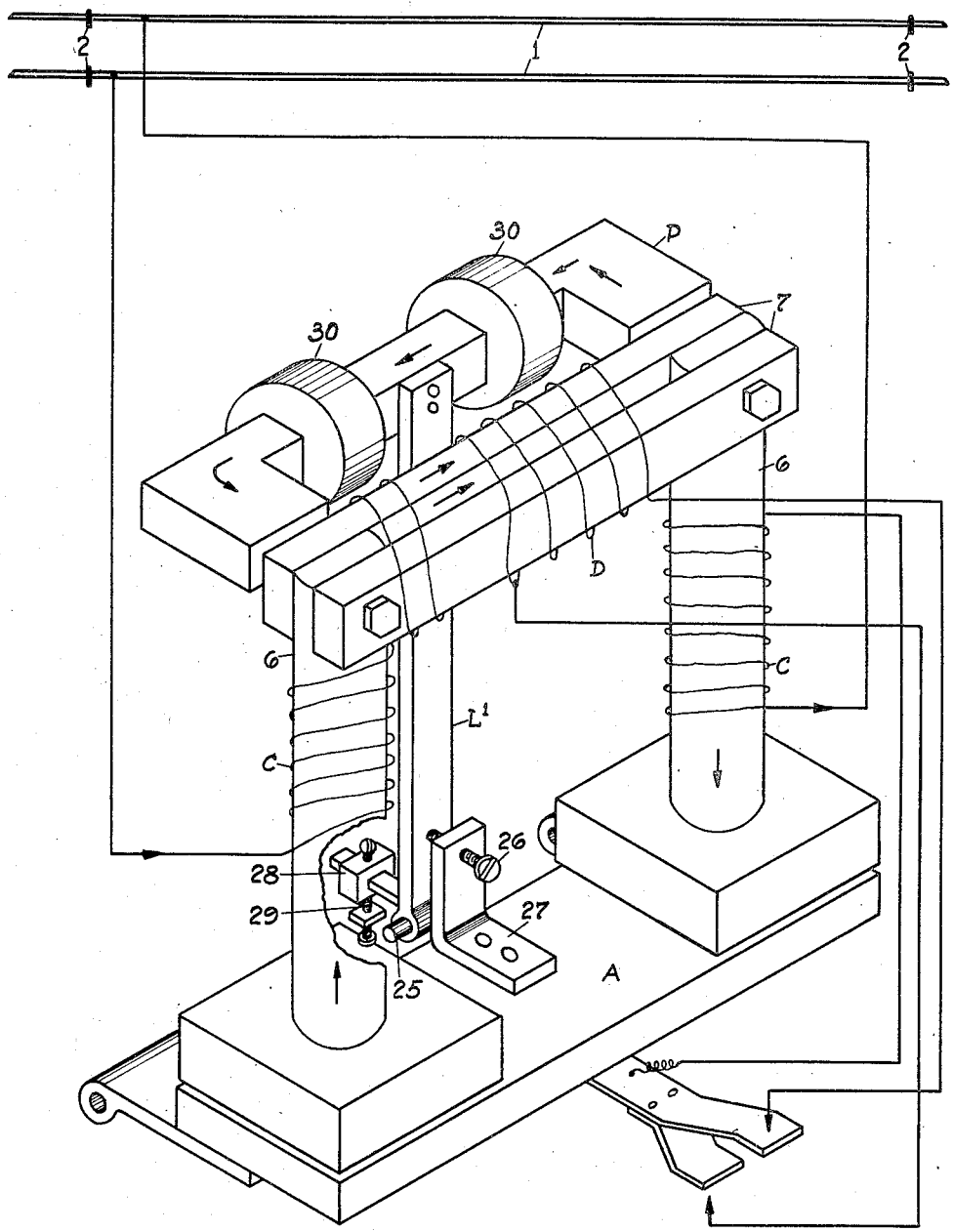
Figure 4:
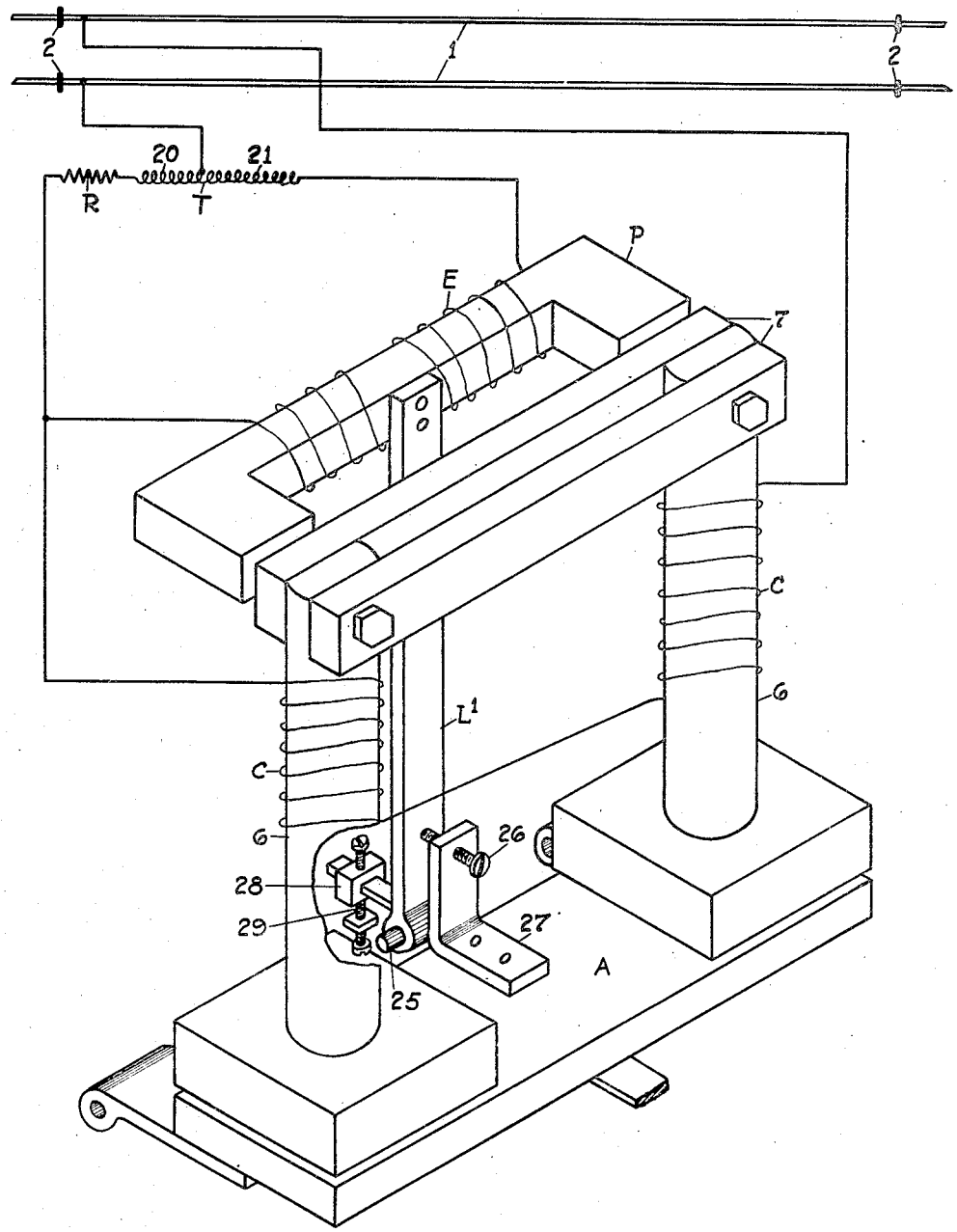

In the accompanying drawings, Fig. 1 is a schematic and diagrammatic illustration of one specific embodiment of the invention; and Figs. 2, 3, and 4 are similar illustrations of modified constructions and arrangements of parts.

Referring to Fig. 1, it is contemplated that the track rails 1 will be bonded together and divided by insulated joints 2 into track circuit sections in the usual way, with a track battery 3 or other source of current connected across the track rails at the exit end of the track section, in series with the usual adjustable limiting resistance 4, all in accordance with well-known practice.

The invention further contemplates the use of a track relay of the usual type and structural organization, with certain variations and additions; and in such a typical relay construction contemplated, there is a pivoted armature A, to which is attached the usual insulated contact finger 5 arranged upon movement to engage stationary front and back contacts indicated by arrows. This armature is picked up or attracted by an electro-magnet of the usual construction, comprising a pair of cores 6 with enlarged pole pieces, connected by back yoke 7 and carrying coils or windings C, only one of said cores and coils appearing in the side view illustrated.

For the purpose of carrying out the principles and functions of this invention, such a typical relay structure is provided with a lever or arm L, pivoted near one end, preferably on the same axis as the armature A, and carrying an adjustable stop screw 8 engaging the armature. This lever L is biased to move upward away from the armature by an adjustable counterweight 9 and by a spring 10, said spring being attached to the outer end of said arm L, and having its tension varied by an adjusting screw 11. An adjustable stop 12 limits the upward movement of the arm L.

The arm L is pulled downward by a suitable electro-magnetic device which is illustrated in Fig. 1 in the form of a solenoid having a winding S and a vertically disposed core 13 connected to the outer end of the arm L by a pivoted link 14. A weighted or spring biased pivoted armature 15, arranged to be attracted by the energization of the winding S of the solenoid, is preferably provided to maintain contacts 16 (indicated by arrows) closed only so long as some current flows through said solenoid winding, so that upon failure of current through the solenoid winding, these contacts 16 automatically open.

The coils C of the relay are connected across the track rails by wires 17 and 18 in the usual way, in series with a non-inductive resistance R, and also in series with the checking contacts 16. The winding S of the solenoid is connected across the resistance R by wires 19 and 20 in series with a suitable inductive resistance X, preferably of the iron core type.

Under normal conditions, when the track circuit is not occupied, current flows from the track battery 3 through the limiting resistance 4, down one track rail, wire 18, resistance R, coils C of the relay, wire 17¹, contacts 16, and wire 17 back over the other track rail to the battery, as indicated by the arrows. Such direction of current flow is assumed for the purpose of explanation, and it should be understood that the polarities of adjacent track circuits may be staggered if desired.

The flow of this current through the resistance R creates a drop in potential which causes current to flow in the direction indicated by the arrows over wire 19 through the reactor X, solenoid winding S and wire 20. The resistances and number of turns are so proportioned that the amount of current through the solenoid winding S, compared with that through the relay coils C, will cause a downward thrust on the armature A substantially equal to the upward attraction of the armature A, with due regard to the difference in the effective lever arms through which the pulls of the solenoid and the main coil of the relay act. The arm L is preferably made of such a length that the current through the solenoid winding S is relatively small as compared with the current through the relay coils C.

There is a value of current through the main coil C of the relay, which may be termed the normal operating current, and which is merely sufficient, with a suitable margin, to hold the armature A in its attracted position and exert the desired pressure on the front contacts. The position of the counterweight 9 and tension of the spring 10 are so adjusted that, when such operating current flows through the relay coils C, the proportionate amount of current through the solenoid winding S produces a downward pull on the arm L which is substantially equal to the upward pull on this arm L exerted by the counterweight 9 and initial tension of the spring 10. In other words, when normal operating current flows through the relay sufficient to maintain its armature A attracted to exert the desired contact pressure, the downward pull of the solenoid is opposed and substantially balanced by the counterweight 9 and spring 10, in such a way that the solenoid produces no effective downward pressure or thrust against the armature A.

It is contemplated that the battery 3 and limiting resistance 4 will be selected and adjusted so that the relay will receive normal operating current under most unfavorable wet ballast conditions.

Assuming now that the ballast is dry, and the ballast leakage is less than that for which the limiting resistance 4 is adjusted, the current through the relay coil C is greater than the normal operating current; but at the same time there is a proportionate increase in the current through the solenoid winding S which produces a downward pull on the arm L, greater than the opposing biasing force of the counterweight 9 and spring 10, and thereby causes a downward thrust or pressure against the armature A proportionate to and substantially balancing the upward attraction of the armature A greater than the normal operating value. Expressed in another way, the increase of current through the solenoid winding S above that corresponding to the normal operating current for the relay, produces a downward pull acting through the arm L, which increases proportionately with the increase of the upward attraction of the armature A by the current in the coil C greater than the normal operating current.

In other words, the increase in current through the relay, due to drying out of the ballast, and the resultant greater attraction upon the armature A of the relay, is accompanied by a compensating thrust or retracting force, to a degree or extent that the net attraction of the armature A corresponds approximately with normal operating conditions, notwithstanding the existence of a current in the relay coil C greater than the normal operating current.

When a vehicle or train enters the track circuit, the wheels and axles establish a shunt for the relay coils C and reduce the current through these coils in the usual way. This wheel shunt is suddenly established, as distinctive from gradual changes in ballast leakage, and causes a relatively quick reduction in current through the relay coils C and resistance R, such reduction in current of course being retarded by the inductive reactance of the relay itself, and the short-circuiting effect of the wheel shunt. As this current through the relay coils C decreases, and the upward attractive pull on the armature A is reduced, the voltage drop across the resistance R, which may be considered as the voltage supplying current to the solenoid winding S, decreases at a corresponding rate; but the relatively large inductive reactance of the reactor X, together with the inherent reactance of the solenoid winding S itself, retards or delays the fall of current in the solenoid winding S as a result of the reduced impressed voltage. In other words, while the upward attraction of the relay coils C on the armature A is decreased, the downward pull exerted by the solenoid winding S is temporarily sustained, with the result that the armature A is retracted or dropped upon a reduction in the relay current by a suddenly established wheel shunt pull, comparable with the reduction of current required to release the armature when the relay is energized with the normal operating current. It may be considered that the reactor X will store energy in its magnetic field sufficient to sustain the relatively small current through the solenoid winding S, while the attraction of the armature A by the relay coil C is decreased by the wheel shunt.

When the armature A is in its retracted position, the air gap between it and the pole faces of the relay cores 6 is increased, so that the upward pull on this armature A for the same current in the relay coils C is less on account of this larger air gap. The spring 10 is arranged to increase the tension as the arm L follows the armature A to its retracted position, and the pull characteristics of the solenoid are selected so that the proportionate downward thrust on the armature A, exerted by the solenoid with its armature in its retracted position, is less to the extent necessary to compensate for the larger working air gap.

When the train leaves the track circuit, the wheel and axle shunt is suddenly removed, and the current builds up through the resistance R and relay coil C at a rate determined by the electrical characteristics of the circuit; but the reactor X retards or delays the increase of current through the solenoid winding S as the drop in potential across the resistance R increases, so that the upward attraction on the armature A predominates, and this armature is attracted to its normal upper position.

From this explanation it can be seen that, according to the principles and contemplated mode of operation of this invention, increases in the current through the relay above the normal operating value, due to change in ballast resistance, is accompanied by a counteracting or compensating downward pull, so that the relay has substantially the same drop-away characteristics for all current excitations, and further that the reactor X serves as a means to retard or delay the change in the compensating pull when there is a relatively sudden change in current through the relay due to the application or removal of the wheel shunt.

In the modification illustrated in Fig. 2, the primary 20 of an auto-transformer T is included in series with the resistance R and the main coil C of the relay; and the circuit for the solenoid winding S includes the secondary 21 of said transformer T. A single wave rectifier 22, of suitable construction, such as the well-known copper-oxide type, is preferably connected across the primary 20 and resistance R as shown, so as to block the flow of current from the battery, but to permit the flow of circulating current in the branch or shunt circuit including the secondary 21 and solenoid winding S.

In this modification of Fig. 2, the solenoid winding S is provided with an intermediate tap; and when the armature A is attracted to close the front contact 23, the entire winding S is included in the circuit; but when said armature is retracted to close the back contact 23, only a part of the winding is included in the circuit. This expedient is employed to reduce the pull of the solenoid when the armature A is in its retracted position to compensate for the greater working air gap at this armature.

The general plan of operation of the modification of Fig. 2 is similar to that already explained. A gradual change in inter-rail potential at the relay end of the track circuit, due to variations in ballast resistance, produces a proportionate and compensating downward thrust on the armature A for currents in excess of the normal operating current, in the same manner already described. When a train enters a track circuit, the relatively quick change in current through the relay and the primary 20 of the transformer T induces a voltage in the secondary 21 of said transformer, which is in a direction tending to sustain the current through the solenoid S. It is evident that the transformer T may have a larger number of turns on the secondary 21 than on the primary 20, so that a higher voltage is induced in said secondary for a given change in current through the relay. The current in the solenoid winding S, produced by the voltage induced in the secondary 21, may flow through the rectifier 22 and not through the main coils C of the relay. When the train leaves the track circuit, the increase of current through the primary 20 of the transformer T induces a voltage in the secondary 21 in the opposite direction, and thus retards the building up of current in the solenoid winding S, thereby permitting the increase in current in the main relay coil C to attract the armature A.

Fig. 3 illustrates a further modification, in which the compensating pull is exerted by an auxiliary armature P, cooperating with the back yoke 7 of the relay. This auxiliary armature P is secured to the upper end of an arm or lever L¹, pivoted on a suitable shaft 25, preferably on the axis of the pivotal support for the armature A. The arm L¹ transmits a thrust to the armature A through an adjusting screw 26 and a bracket 27 fastened to said armature. An adjustable counterweight 28, normally resting on an adjustable screw 29, is carried on a rearward extension of the arm L¹, and provides a biasing force for the auxiliary armature P corresponding approximately with the attraction of armature P when normal operating current flows through the relay coils C. Short-circuited windings or copper rings or slugs 30 on the auxiliary armature P are employed to retard the change of flux through this armature.

The operation of this modification of Fig. 3 is similar to that already explained. When the relay is energized with normal operating current, the pull on the auxiliary armature P by the winding D on the back yoke of the relay is substantially balanced by the counterweight 28, so that this auxiliary armature does not produce any downward thrust on the armature A. For relay energizing currents greater than the normal operating current, the auxiliary armature P is more strongly attracted by the greater current through the winding D, and exerts through the screw 26 and bracket 27 a downward thrust on the armature A, the parts being so arranged and proportioned that such downward thrust approximately balances the greater attraction of the armature A. If the change in energizing of the current for the relay is gradual, as in the case of variations in ballast resistance, the magnetic flux through the auxiliary armature P may increase or decrease accordingly; but if such change in current is sudden, due to the application or removal of a wheel shunt, the copper slugs 30 so retard the change of flux through said auxiliary armature P that the armature A may pick up and drop. In connection with Fig. 3, the number of turns on the winding D on the back yoke is preferably varied automatically as the armature A moves from its attracted to its retracted position by the closing of front and back contacts to change the circuit connections to this winding, as will be readily apparent from the drawings. Also, the normal operating air-gap for the auxiliary armature P and the extent of its movement is preferably such that a relatively small change in its operating air gap occurs when the armature A moves, as compared with the change in the working air gap of said armature A.

Fig. 4 illustrates a further variation or modification of the organization shown in Fig. 3, in which a winding E on the auxiliary armature P is included in a circuit similar to that employed for energizing the solenoid winding S in Fig. 2, the general plan of operation being then substantially the same as that of Fig. 2.

It may be considered that one characteristic of this invention is the application of a pull compensating means to the armature A of a conventional electro-magnet in such a way that, for currents in excess of a predetermined normal operating current, the excess attraction of the armature is balanced by a retracting force, the pull compensating means being responsive to a current proportionate to the energizing current for the relay.

With this feature, substantially the same reduction in the exciting energizing current for the relay acts to release the armature, irrespective of the intensity of the relay energizing current in excess of a selected normal operating current within limits. In other words, when the track relay is energized with excess current under dry ballast conditions, a predetermined amount of reduction in this current allows the armature to drop. For example, if the normal operating current is in the order of 150 milliamperes, and the armature drops when this current is reduced to about 75 milliamperes, then a reduction of approximately 75 milliamperes in the current through the relay in excess of such normal operating current will likewise cause the armature to drop, this assuming that the compensating pull remains substantially constant as the relay energizing current is reduced. In the case of the transformer arrangement illustrated in Figs. 2 and 4, there may be some increase in the compensating pull as the normal attraction on the armature is reduced, so that a sudden reduction of the relay energizing current caused by a wheel shunt may allow the armature to drop with a smaller decrease of current than if such decrease were gradual.

Another characteristic feature of the invention involves the use of means for temporarily delaying or retarding the change in the pull compensating means, in response to a change in relay energizing current, so that a sudden change occasioned by the application and removal of a wheel shunt, will allow the armature to respond such change, without the opposing influence of the pull compensating means. Such retarding means, like the reactor X of Fig. 1, may have the function of sustaining the then existing compensating pull; or, as exemplified by the transformer T in Figs. 2 and 4, such retarding means may tend to increase or decrease the compensating pull as the relay energizing current is suddenly reduced or increased respectively.

The invention further involves a reduction in the effectiveness of the pull compensating means as the armature moves to its attracted position, and the pulling compensating means at the same time changes towards its attracted position, so as to compensate for the larger working air gap at the armature. Further, there is also preferably provided means, such as the contacts 16 shown in Figs. 1 and 2, for checking the integrity of the circuit of the pull compensating means. Such checking contacts are not illustrated in Figs. 3 and 4; but it can be readily seen how they could be applied to these modifications.

The particular construction assumed and arrangement of parts shown and described are merely illustrative of the nature of the invention; and various adaptations, modifications, and additions may be made to these specific embodiments, without departing from the invention.

What I claim is:—

1. In a track circuit for railroads, a track relay comprising, an armature, an electro-magnet for attracting said armature, means supplied with current proportional to that flowing through the electro-magnet for exerting a retracting force on said armature, and means for retarding temporarily a change in current through said means.

2. In a direct current track circuit of the usual type, a track relay comprising a movable armature, windings for said track relay normally supplied with proportionate currents from said track circuit for exerting opposing pulls on said armature, and means effective upon a change in the current supplied to said track relay for temporarily retarding the change in current through one of said windings with respect to the change of current flow in the other winding.

3. In a track circuit for railroads including the usual track battery and limiting resistance, an electro-responsive device connected across the track rails and comprising, an armature and contacts operated thereby, cores and coils for attracting said armature, pull compensating means including an auxiliary winding adapted to exert a retracting force against said armature, said auxiliary winding being energized with a current proportionate to the energizing current for said coils, means opposing said pull compensating means to a degree comparable with the force required to hold said armature in its attracted position, and means associated with said pull compensating means for temporarily delaying a change in the pressure exerted thereby upon the armature when a relative quick change in the relay energizing current occurs.

4. An electro-responsive device for track circuits on railroads comprising, a pivoted armature and contacts operated thereby, an electro-magnet for attracting said armature, an auxiliary electro-magnetic device acting to produce a retracting force acting on said armature, said auxiliary device being energized with a current proportionate to the energizing current for the electro-magnet, biasing means opposing the thrust of said auxiliary device, and an inductive reactance in the energizing circuit for said auxiliary device acting to retard a temporary change of current therein.

5. An electro-responsive device for track circuits for railroads comprising, an electro-magnet having a movable armature, pull compensating means exerting a retractive force on said armature proportional to the energizing current of the electro-magnet, biasing means opposing and substantially balancing said pull compensating means when the electro-magnet is energized with a normal operating current, and means temporarily retarding a change in the retractive force exerted by said pull compensating means upon a relatively sudden change in the energizing current for said electro-magnet.

6. In a track circuit for railroads, an electro-responsive device connected across the track rails and comprising, a movable armature, an electro-magnet for attracting said armature, an auxiliary electro-magnet energized by current proportional to the energizing current for said main electro-magnet for producing a retracting force acting on said armature, biasing means opposing to a predetermined extent the retracting force exerted by said auxiliary electro-magnet, and means responsive to a relatively sudden change in the energizing current for said main electro-magnet for inducing a voltage in the energizing circuit for the auxiliary electro-magnet to retard temporarily a corresponding change in the current therein.

7. An electro-responsive device for track circuits comprising, an electro-magnet having a movable armature biased to its retracted position, and means energized with unidirectional current proportional to the unidirectional current energizing said electro-magnet for exerting a correspondingly variable force to move said armature toward its retracted position during slow changes in the sum of said currents but causing non-proportional currents to exert a different ratio of forces during quick changes in the sum of said currents.

8. An electro-responsive device for track circuits comprising, an electro-magnet having a movable armature, a resistance in the energizing circuit for said electro-magnet, an auxiliary electro-magnetic device energized by the voltage drop across said resistance for producing a retracting force proportional to such voltage drop on said armature, and means associated with said auxiliary electro-magnetic device for temporarily retarding the change in current through it upon a change in the voltage drop across said resistance.

9. An electro-responsive device for track circuits comprising, an electro-magnet having a movable armature, a resistance in the energizing circuit for said electro-magnet, pull compensating means energized by the voltage drop across said resistance, biasing means opposing and substantially balancing said pull compensating means when said electro-magnet is energized with normal operating current, and inductive means acting to temporarily retard the change of current through said pull compensating means.

10. An electro-responsive device for track circuits for railroads comprising, an electro-magnet having a movable armature biased to a retracted position, a pivoted lever engaging said armature, an auxiliary electro-magnetic device for moving said lever in a direction to exert a force against said armature to move it toward its retracted position, means for energizing said auxiliary device with current proportional to the current supplied to said electro-magnet, biasing means opposing movement of said lever by said auxiliary device, and means for temporarily retarding the change of current through said auxiliary device.

11. In a track circuit for railroads, a relay connected across the track rails in series with a resistance and the primary of a transformer, pull compensating means for exerting a retracting force on the armature of said relay, said pull compensating means being energized by the voltage drop across said resistance and including in its energizing circuit the secondary of said transformer, and means for opposing and substantially balancing the retracting force of said pull compensating means when said relay is energized with normal operating current.

12. An electro-responsive device of the character described, comprising in combination with a movable armature and an electro-magnet for attracting said armature, of means energized with current proportional to the energizing current of said electro-magnet for applying a retracting force on said armature for current excitation above a predetermined normal operating current, and apparatus including said means for causing said retracting force to be temporarily increased in relation to the attracting force when the energizing current for said electro-magnet is suddenly decreased.

13. An electro-responsive device of the character described, comprising in combination with a movable armature and an electro-magnet for attracting said armature, of means energized with current proportional to the energizing current of said electro-magnet for applying a retracting force on said armature for current excitation above a pedetermined normal operating current, and a transformer for inducing a current in said means to cause said retracting force to be temporarily increased in relation to the attracting force when the energizing current for said electro-magnet is suddenly decreased.

14. An electro-responsive device of the character described, comprising in combination with a movable armature and contacts operated thereby, an electro-magnet for attracting said armature, an auxiliary electro-magnetic device acting to produce a retracting force acting on said armature, said auxiliary device being energized with a current proportionate to the energizing current for the electro-magnet, biasing means opposing the retracting force of said auxiliary device, an inductive reactance in the energizing circuit for said auxiliary device acting to retard a temporary change of current flow therein, and means for breaking the circuit for said electro-magnet upon interruption of the flow of current in said auxiliary electro-magnet.

15. A relay for track circuits comprising, a lever cooperating with the armature of said relay to exert a pressure tending to move said armature to its retracted position, a winding for actuating said lever, biasing means for opposing movement of said lever by said winding, means for normally energizing said winding with current proportional to the current supplied to said relay, and means for preventing a rapid change of flux through said winding.

16. A relay for track circuits comprising, a magnetizable means acting mechanically upon the armature of said relay to exert a pressure tending to move said armature to its retracted position, a winding acting upon said magnetizable means, biasing means for opposing movement of said magnetizable means, means for normally energizing said winding with current proportional to the current supplied to said relay, and auxiliary means for opening the circuit for said relay upon a break in the circuit for said winding.

17. A relay for track circuits comprising, a magnetizable means acting mechanically upon the armature of said relay to exert a pressure tending to move said armature to its retracted position, a winding when energized acting upon said magnetizable means, biasing means for opposing movement of said magnetizable means, means for normally energizing said winding with uni-directional current proportional to the uni-directional current supplied to said relay, and an inductance included in series with said winding to prevent a rapid change of current flow in said winding.

18. A relay for track circuits comprising, a lever cooperating with the armature of said relay to exert a pressure tending to move said armature to its retracted position, a winding for actuating said lever, biasing means for opposing movement of said lever by said winding, means for normally energizing said winding with current proportional to the current supplied to said relay, and a rectifier for allowing a more rapid change of current flow in said relay than in said winding upon a decrease in the sum of the currents flowing in said relay and winding.

19. An electro-responsive device of the character described, comprising in combination with a pivoted armature and a main electro-magnet for attracting said armature, an arm fixed to and extending beyond said armature and to the same side of the pivot as is the armature, an auxiliary electro-magnet normally energized through a circuit more highly inductive than is the circuit of said main electro-magnet with current proportional to the energizing current of said main electro-magnet for coacting with the extended end of said arm for applying a retracting force on said armature which force is retained longer than the force acting on said main electro-magnet upon a reduction in the operating current.

20. A relay for track circuits having an electro-magnet and an armature operable by the electro-magnet to attracted position, a winding for retracting the armature and so coacting with the armature as to cause a unit of flux produced by the winding to exert a greater retracting effort on the armature than does a unit of flux produced by the electro-magnet in attracting the armature, and means for normally energizing said winding with current proportional to the current supplied to said relay.

21. An electro-responsive device of the character described; the combination with an electro-magnet; a first armature biased by gravity to a retracted position and movable about a pivot, and positioned to be attracted against the force of gravity by said electro-magnet when energized; a multiplying arm arranged when in an operated position to act upon said first armature in a direction to retract the same; a second armature connected to said multiplying arm and biased by gravity to a retracted position and arranged to be attracted by said electro-magnet when said electro-magnet is energized, and when so attracted actuating said arm to said operated position; and a short-circuited coil on said second armature; whereby upon energization of said electro-magnet said first armature is immediately attracted and said second armature is subsequently attracted to produce a retracting force upon said first armature and whereby upon partial deenergization of said electro-magnet the attractive force upon said first armature is first reduced.

NEIL D. PRESTON.